March 18, 1969     W. J. FANNING     3,432,901
CAPACITOR WINDING APPARATUS

Filed Dec. 28, 1965     Sheet 1 of 6

FIG. 1

INVENTOR
W. J. FANNING
BY A. C. Schwarz, Jr.
ATTORNEY

United States Patent Office 3,432,901
Patented Mar. 18, 1969

3,432,901
CAPACITOR WINDING APPARATUS
William J. Fanning, Melrose Park, Ill., assignor to Western Electric Company, Incorporated, New York, N.Y., a corporation of New York
Filed Dec. 28, 1965, Ser. No. 517,007
U.S. Cl. 29—25.42                     11 Claims
Int. Cl. H01g 13/00; B65b 54/00

ABSTRACT OF THE DISCLOSURE

An apparatus for automatically winding two conductive foils and two dielectric films into a capacitor and sealing the wound structure to prevent unwinding thereof. The capacitor is rapidly wound through a predetermined number of turns to equal approximately 80% of its final, predetermined capacitance. It is then connected to a capacitance sensing device and slowly wound until the sensing device indicates that the capacitance has reached the predetermined value. If the sensing device fails to measure the predetermined capacitance within a predetermined time, it is assumed that the capacitor is unacceptable and the wound structure is sealed and directed to a reject bin.

---

The present invention relates to capacitor winding apparatus and more particularly to apparatus for winding polystyrene capacitors to close tolerances.

In the manufacture of capacitors from foils and dielectric webs where the capacitors are wound on a rigid cycle of a fixed number of turns such capacitors may be fabricated to a close tolerance if the thickness of the webs is uniform. However, where the web varies in thickness, such for example, as with polystyrene webs, the capacitance of such capacitors, likewise, will vary over a wide range. A capacitance sensing device may be employed in the winding apparatus to monitor the capacitance of the unit being wound and to effect the severance of the foils when the capacitance reaches a predetermined value and to effect the completion of the winding operation without regard to the number of turns of the foils. However, the use of a capacitance sensing means to effect the severance of the foils and the completion of the winding operation produces another problem, namely, that if a defective unit is being wound which does not have sufficient capacitance to effect the operation of the sensing device, there occurs a prolonged overwinding of the webs and the foils which results in damage to the winding apparatus.

An object of the invention is to provide an apparatus for winding capacitors to a close tolerance from dielectric webs of variable thickness and metallic foils.

Another object of the invention is to provide a capacitor winding apparatus having mechanism for preventing prolonged overwinding of the capacitor forming material in the event the capacitor being wound is defective.

A further object of the invention is to provide a capacitor winding apparatus having means for detecting defective capacitors as they are being wound and for segregating them.

In accordance with the present invention as applied to a capacitor fabricating apparatus wherein capacitor-forming strips are wound into a capacitor, a defective capacitor is detected during the winding thereof and is removed from the fabricating apparatus.

Other objects, advantages and novel aspects of the invention will become apparent upon consideration of the following detailed description, in conjunction with the accompanying drawings, in which.

Referring to the drawings, the winding apparatus comprises a pair of composite arbors 20 rotatably mounted on a turret 22 which is indexible to advance the arbors successively to a first or winding station 24 and a second or sealing and ejecting station 26. Each of the composite arbors 20 (FIG. 5) is split and has two sections 20–1 and 20–2 for winding a pair of tin foils 30 and a pair of polystyrene or other dielectric webs 31 into a capacitor roll 32 at the winding station. The foils and webs are guided toward the arbor 20 by a pair of pinch rollers 35, a pair of foil clamping rollers 37 and guide rollers 39, from supply rolls 40 and 41, respectively, of the foils and webs mounted on suitable supports on a vertical frame plate 43. The arbor supporting turret 22 includes a pair of circular heads 45, 46 which are interconnected by a central hollow hub 47 and are rotatably mounted, respectively, in the vertical frame plate 43 (FIG. 6) and a companion frame plate 44.

Each of the arbor sections 20–1 and 20–2 comprise thin semi-cylindrical portions 20–3 adopted to engage the capacitor forming webs and foils therebetween and to wind the webs and foils thereon. The arbor sections have enlarged semi-cyclindrical shanks 20–4 slidably mounted in a hollow spindle 50 for axial reciprocatory movement relative to each other and to the spindle to and from the extended operative position (FIG. 5) and a retracted position. The hollow spindles 50 are rotatably supported in the turret heads 45, 46.

Figure 5:
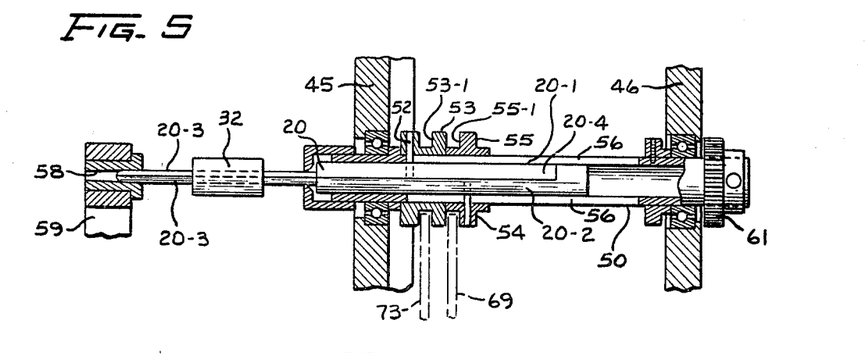
FIG. 5 is a vertical sectional view through the apparatus showing one of the composite arbors at the winding station.
Figure 6:
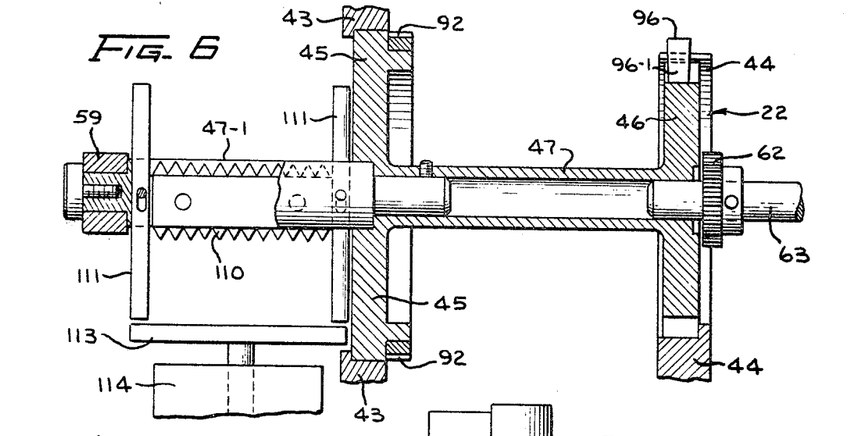
FIG. 6 is a fragmentary vertical, longitudinal sectional view of the apparatus showing a portion of the turret and the webs severing mechanism.
Figure 7:
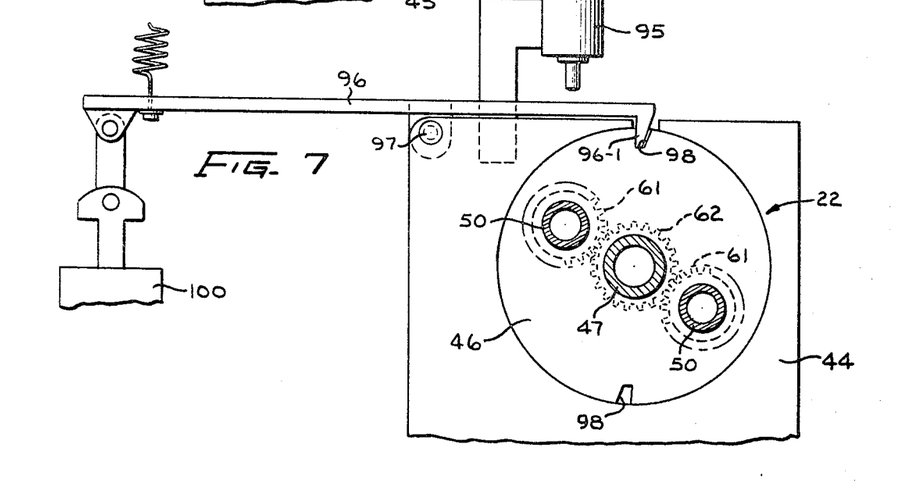
FIG. 7 is a vertical cross sectional view of a portion of the turrent and a locking latch associated therewith.

The arbor section 20–1 is connected by a pin 52 to a collar 53 which is slidably mounted on the hollow spindle 50 and has a central annular groove 53–1 therein. The other arbor section 20–2 is likewise connected by a pin 54 to a collar 55 which is slidably supported on the hollow spindle 50 and is provided with a rabbeted groove 55–1 adjacent to the collar 53. Each spindle is provide with a pair of opposed longitudinal slots 56 to provide for longitudinal movement of the pins 52, 54 and to effect a driving engagement between the spindles 50 and the arbor sections 20–1, 20–2. In the advanced position the arbor sections are supported at the free ends thereof in recesses formed in support members 58 mounted rotatably in a cross arm 59. The cross arm is secured to one end of a portion 47–1 of the cylindrical hub which extends from the head 45 of the turret 22.

Simultaneous rotation is imparted to the pair of composite arbors 20 through gears 61 (FIGS. 2, 5–7) which are secured to the spindles 50 and mesh with a driving gear 62 secured to a drive shaft 63. The drive shaft 63 is supported at one end in a pilot bearing in the turret hub 47 and in suitable bearings (not shown) and is rotated through a sprocket and chain connection 64 from a drive motor 65.

At the second station 26 mechanism is provided for retracting the arbor sections 20–1, 20–2 individually from the capacitor roll 32 to effect the ejection of the latter on completion of the winding operation. The mechanism includes an actuating finger 69 which is connected to a piston rod 70 of an air operated actuator 71 and is disposed normally in an advanced position to fit in the rabbeted groove 55–1 of the collar 55 when the arbor 20 moves into the second station 26. An actuating finger 73 which is normally positioned to fit in the groove 53–1 of the collar 53 as the arbor arrives at the second station is secured to a piston rod 74 of an air operated actuator 75.

Compressed air under control of a valve 76 and a solenoid 77 is admitted to one end of the actuator 71 to effect the retraction of the first arbor section 20–2 from the capacitor roll 32. In response to admission of compressed air to one end of the actuator 75 under control of a valve 78 and a solenoid 79 the collar 55 of the second arbor section 20–1 is moved axially to the retracted position to withdraw the arbor section from the capacitor roll 32. After the ejection of the capacitor roll the actuator 75 serves to return the second arbor section 20–1 to its advanced position at the second station 26.

At the first station 24 an actuating finger 80 is mounted on a piston rod 81 of an actuator 82 in a normal position adjacent to the collar 55 of the first arbor section 20–2 in the retracted position of the arbor section. In response to the flow of compressed air into one end of the actuator 82 under control of a valve 83 and a solenoid 84, the actuating finger 80 is moved into engagement with the collar and effects the movement of the first arbor section 20–2 to the forward position, and the actuation of a switch 85. The purpose of the switch will be described more fully hereinafter.

Rotation of the turret through 180° indexing movements is effected by mechanism including a countershaft 87 which is driven from the drive shaft 63 through a chain and sprocket connection 88 under control of an electromagnetic clutch 89. A gear 90 on the countershaft 87 is connected through an idler gear 91 to a ring gear 92 on the head 45 of the turret. Energization of the clutch 89 is controlled indirectly by a switch 95 in a manner to be described hereinafter. The switch 95 is actuated in turn by a latch 96 which is mounted for pivotal movement on a fixed pin 97. The latch 96 (FIG. 7) is spring urged to cause the hook end 96–1 thereof to drop into peripheral notches 98 in the turret head 46 and lock the turret 22 in predetermined positions. A latch unlocking solenoid 100 is provided for effecting the disengagement of the latch 96 from the turret head 46 and the indexing of the turret as will be described more fully hereinafter.

Figure 4:
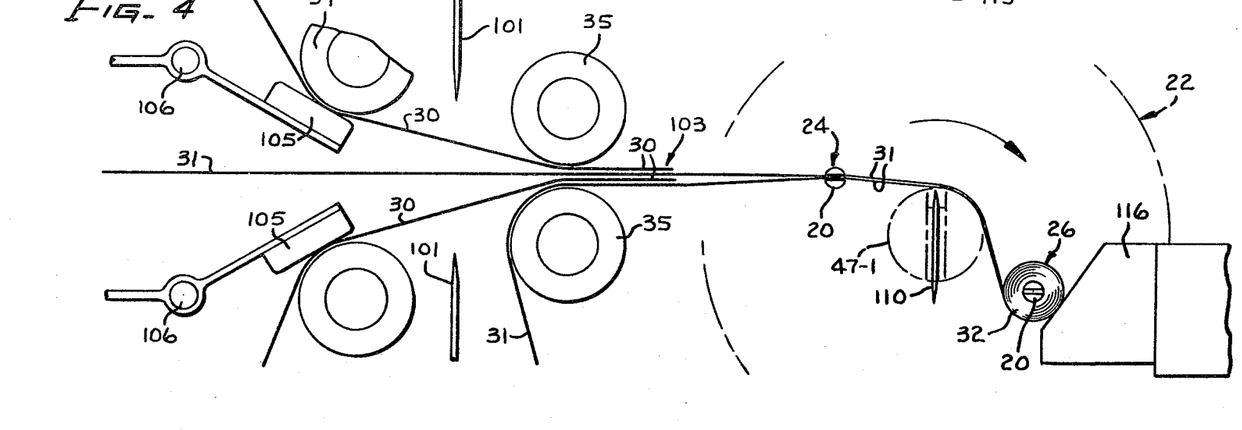

Severance of successive portions of the advancing foils 30 is effected by forming a transverse row of perforations in each of the foils with quick-acting perforating blades 101 disposed vertically between the pair of pinch rollers 35 and the foil clamping rollers 37. The perforating blades 101 have serrated cutting edges and are actuated by solenoids 102 which are suitably supported on the vertical frame plate 43. The foil strips are advanced until the rows of perforations therein are in a predetermined severing position 103 (FIG. 4) between the pinch rollers 35 and the arbor 20 at the winding station 24 at which time the foils 30 are pressed against the rollers 37 by clamping arms 105 to stop the movement of the foils 30 and effect the severance thereof at the weakened portion along the rows of perforation therein. The clamping arms 105 are supported for pivotal movement about fixed pins 106 and are actuated by solenoids 107 supported on the frame plate 43.

After the foils 30 have been severed and the trailing ends of the foils have been wound onto the capacitor roll 32 the turret 22 is indexed and carries the capacitor roll to the second station 26. During this indexing movement the foils 30 from the supply rolls thereof are held by the clamping arms 105 while six extra turns of the webs 31 are being wound onto the arbor and the webs are being pulled by the arbor over and beyond the hub portion 47–1 of the turret and brought into engagement therewith and supported thereby above a web shearing blade 110 (FIG. 4) mounted movably in the hub portion 47–1.

The blade 110 has opposed serrated edges and is mounted in an H-shaped carrier 111 which is supported in a longitudinally and radially disposed slot in the hub 47–1 for limited radial movement. The downwardly directed arms of the H-shaped carrier are disposed above and in the path of movement of a cross member 113 on the actuating plunger of a solenoid 114 for actuation thereby in response to energization of the solenoid. The upper serrated edge of the blade is normally located in the slot below the upper surface of the hub 47–1 and the lower serrated edge projects beneath the lower surface of the hub. In response to energization of the solenoid 114 the carrier 111 and the cutting blade 110 are raised rapidly to cause the upper serrated cutting edge to sever the webs 31 and to move the lower serrated edge of the blade within the slotted hub. Resilient means (not shown) are provided for frictionally retaining the carrier 111 and the blade 110 in the actuated position in the slotted hub.

An electrically heated sealing member 116 is mounted for horizontal movement at the second station 26 of the apparatus and is urged by a spring 117 to an operative position in the path of movement of a wound capacitor roll 32 for engaging the roll and effecting the sealing of the trailing ends of the webs 31 thereto. The sealing member 116 is connected to a piston rod of an air operated actuator 118 and is moved thereby from the capacitor roll 32 to a retracted position in response to the admission of compressed air to the actuator under control of a valve 119 and a solenoid 120.

When the foil strips 30 have been severed, the leading end portions of the foil strips from the supplies thereof are stationary and are located between the pair of pinch rollers 35 (FIG. 4) which are disposed normally in spaced relation to each other to permit free movement of the foils 30 and the webs 31 therebetween. To effect the movement of the stationary foils 30 with the moving webs 31 onto the rotating arbor 20 at the winding station, the lower pinch roller 35 is moved upwardly to press the webs and foils into engagement with each other. Accordingly, the lower pinch roller 35 is suppported rotatably in a cradle 123 which is mounted for pivotal movement about a pin 124 and has an arm 125 extending therefrom into engagement with the cross arm 113 of the solenoid 114 for actuation thereby.

Figure 8:
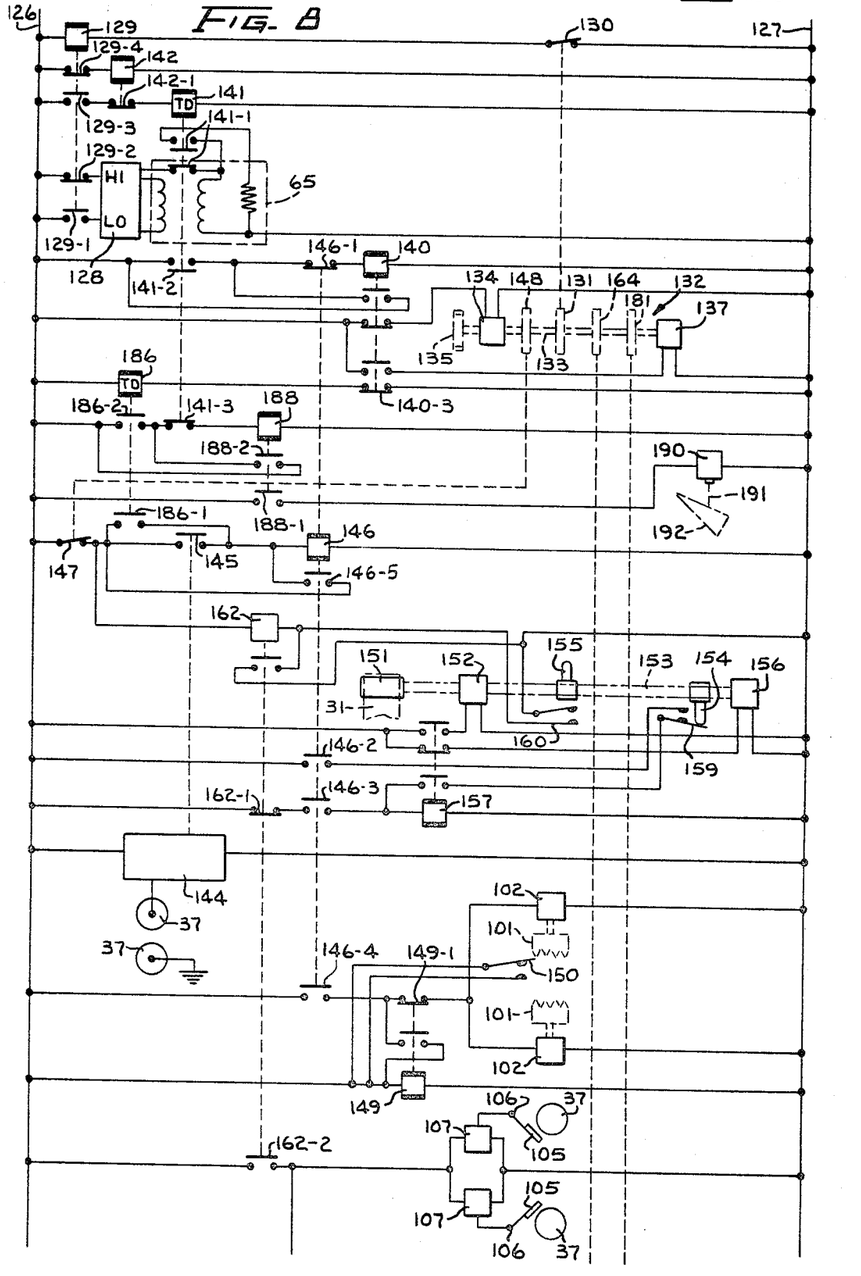
FIGS. 8 and 8A together constitute a diagrammatic view of the electrical control mechanism of the apparatus.

As shown diagrammatically in FIG. 8, the motor 65 is connected across a pair of electrical power lines 126, 127 and runs continuously during the operation of the apparatus. The speed of the motor is shiftable to and from high and low levels by a control indicated at 128 and including two sets of contacts 129–1, 129–2 of a relay 129. The relay 129 is connected to the power lines in series with a switch 130 which is operated by an actuating element 131 of a mechanically operated timing device 132.

The timing device is indicated diagrammatically (FIGS. 2 and 8) as a plurality of switch actuating elements in the form of rotary cams mounted on a cam shaft 133. The cam shaft is suitably supported in the apparatus and is connectable through an electromagnetic clutch 134 to a worm wheel 135 that is driven by a worm gear 136 on the drive shaft 63. An electromagnetic brake 137 is also provided for stopping the cam shaft 133. The clutch 134 and the brake 137 are controlled by a relay 140 which in turn is controlled by relay 141, a time delay relay 142, and the relay 129.

Figure 8A:
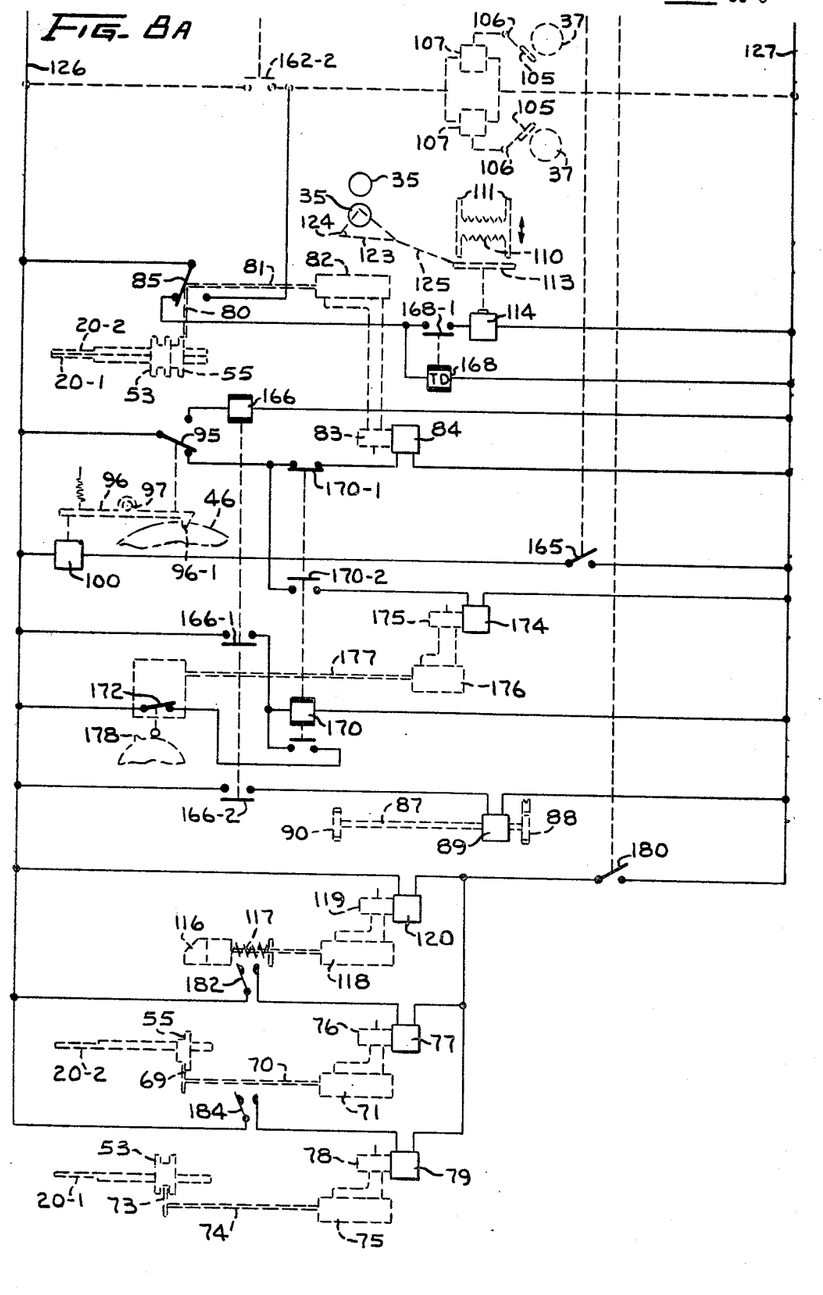

In the electrical control system disclosed in FIGS. 8 and 8A the contacts and switches thereof are shown in the condition that obtains at a portion of the cycle of operation when the arbor at the winding station is winding the foils and webs thereon at high speed.

A suitable capacitance sensing device such as an oscillator detector bridge network indicated diagrammatically at 144 is electrically connected to the foil clamping rollers 37 for monitoring the capacitance of the capacitor roll 32 being wound. The sensing device 144 has a relay (not shown) the contacts 145 of which are connected in series with control relay 146 and a normally closed switch 147. The switch 147 is actuated momentarily to open position by a cam 148 on the cam shaft 133 of the timing device during each cycle of operation to reset the control relay 146.

After the capacitor roll 32 has been wound through a predetermined number of turns and has reached approximately 80% of the desired capacitance value, the switch 130 is opened by the cam 131 to effect the deenergization of the control relay 129 and the shifting of the four sets of relay contacts thereof from one position to the other. With the opening of the relay contacts 129–4 the time delay relay 142 is deenergized and the normally closed contacts 142–1 thereof open after a one-half second interval of time. With the closing of relay contacts 129–3, the relay 141 is energized (until the time delay contacts 142–1 open) and effect the shifting of the contacts 141–1, 141–2, and 141–3. The momentary change of the contacts 141-1 effects the dynamic braking of the motor 65 causing it to slow down, and the closing of contacts 141–2, effects the energization of the relay 140 which locks itself in across contacts 141–2 and in series with closed contacts 146–1 of a relay 146. With the deenergization of the relay 141 and the return of the contacts 141–1 the motor continues running—but at low speed.

With the energization of the relay 140, the magnetic clutch 134 is deenergized and the electromagnetic brake 137 is energized to stop the rotation of the cam shaft and render the timing device 132 inoperative.

As the winding of the capacitor continues at low speed the sensing device 144 monitors the capacitance of the capacitor roll 32. When the capacitance of the roll has reached a predetermined value, the sensing device 144 operates to close the relay contacts 145 thereof and thereby effect the energization of the control relay 146 which locks itself in across the relay contacts 145 and causes the shifting of the relay contacts 146–1, 146–2, 146–3, and 146–4. With the opening of the relay contacts 146–1 the relay 140 is deenergized resulting in the energization of the clutch 134 and the deenergization of the brake 137, thereby effecting rotation of the cam shaft 133 and rendering the timing device 132 operative.

In response to closing of the relay contacts 146–4, solenoids 102, 102 are energized and effect the actuation of the perforating blades 101 into engagement with the foils 30, 30 and the forming of the transverse row of perforations in each foil. In response to the downward movement of the upper perforating blade 101 a switch 150 is closed, thereby effecting the energization of a control relay 149 which locks itself in across the relay contacts 146–4 and through the opening of its contacts 149–1 effects the deenergization of the solenoids 102, 102 and the return of the perforating blades 101, 101.

After the foils 30 have been weakened by the formation of the rows of perforations therein it is necessary to advance the foils through a certain distance so as to locate the weakened perforated portions thereof at the severing position 103 between the winding arbor 20 and the pinch rolls 35 before actuating the clamping levers 105 to grip the foils against the rollers 37. The accurate locating of the perforated portions of the strip prior to the severance of the foils is achieved by a mechanism including a metering roller 151 over which the upper web 31 is entrained and imparts rotation thereto.

The metering roller 151 (FIGS. 2 and 8) has a predetermined circumference and rotates through one-half revolution in response to the advancement of the rows of perforations and the foils 30 to the severance position 103. Connectable to the roller 151 through a electromagnetic clutch 152 is a switch actuating shaft 153 having a pair of switch actuating elements 154 and 155 disposed radially on opposite sides thereof. An electromagnetic brake 156 serves to hold the shaft 153 against rotation when the clutch 152 is deenergized, the clutch 152 and the brake 156 being alternately energized under control of a relay 157. In response to the energization of the perforator control relay 146 and the closing of the contacts 146–3 thereof the relay 157 is energized and effects the deenergization of the brake 156 and the energization of the clutch 152 to cause the shaft 153 to rotate and the element 154 to disengage a switch 159 (which was held open by the element) and effect the closing of the switch 159 and the locking in thereby of the control relay 157.

On completion of half the revolution of the shaft, 153 the element 155 effects the closing of a switch 160, thereby effecting the energization of a relay 162 resulting in the locking in of the relay across the switch 160, the opening of contacts 162–1 and the closing of the contacts 162–2. With the closing of the contacts 162–2 the solenoids 107 are energized to effect the movement of the clamping arms 105 against the rollers 37 to grip and hold the portions of the foils on one side of the rows of perforations while the portions of the foils 30 on the other side of the perforations are advanced by the winding of the capacitor roll 32 on the arbor 20. This results in the severance of the foils 30 along the rows of perforations with the leading end of the foil from the supplies thereof disposed between the pinch rolls 35 and with the trailing ends of the severed foils being wound onto the capacitor roll 32.

After the relay 140 is deenergized and the cam shaft 133 is again operative, the arbor 20 winds approximately 6 turns of the webs onto the capacitor roll 32, at which time a cam 164 of the timing device 132 actuates a switch 165 to closed position to effect the energization of the solenoid 100. This causes the latch 96 to disengage from the notch 98 in the head 46 of the turret and actuate the switch 95 to its other position and thereby effect; (a) the deenergization of the solenoid 84 and (b) the energization of a relay 166. In response to deenergization of solenoid 84 the actuator 82 is operated to retract the piston 81 thereof and the arbor actuating finger 80 from the advanced position to the retracted position. This in turn allows the switch 85 to shift to its other position and effect; (a) the deenergization of a timed out time delay relay 168, and (b) the closing of a circuit to provide a connection from the power line 126 to the foil clamping solenoids 107 to control timing of the deenergization of the latter.

With the energization of relay 166, the contacts 166–1, 166–2 are shifted to closed condition. With the closing of the contacts 166–1 a relay 170 is energized and locks itself in series with a switch 172. The relay 170 has contacts 170–1 in series with the solenoid 84, and has contacts 170–2 in series with a solenoid 174 and the switch 95. The solenoid 174 controls a valve 175 of an air operated actuator 176 that has a piston rod 177 on which the trip switch 172 is mounted. The switch 172 is supported in a normal retracted position adjacent to a trip cam 178 secured to and rotatable with the drive shaft 63 and is advanced at a predetermined time into the path of the trip cam for actuation thereby.

In response to closing of the contacts 166–2 of relay 166 the electromagnetic clutch 89 is energized and effects a driving connection between the drive shaft 63 and the gear 90 and thereby imparts rotation to the turret 20. After the turret begins to rotate, the switch 165 is opened by the cam 164 of the timing device 132 resulting in the deenergization of the solenoid 100 and the movement of the latch 96 into engagement with the periphery of the head 46 of the turret.

When the turret 22 has been rotated through one-half turn, the latch 96 drops into the other notch 98 therein and causes the switch 95 to return to the first position indicated in FIG. 8A. This effects (a) the deenergization of relay 166, resulting in the deenergization of electromagnetic clutch 89 and the disengagement of the turret drive, and (b) the energization of the solenoid 174 through the relay contacts 170–2, resulting in the operation of the actuator 176 and the movement of the switch 172 into the path of rotary trip cam 178 and the subsequent actuation of the switch 172 to open position at a precise moment in the cycle of operation. This effects the deenergization of relay 170 and the opening of contacts 170–2, resulting in the deenergization of the solenoid 174, the reverse operation of the actuator 176 and the withdrawal of the switch 172 to its normal retracted position.

In response to the deenergization of relay 170 the relay contacts 170–1 thereof are moved to closed position thereby effecting the energization of the solenoid 84, the operation of the actuator 82 to advance the piston rod 81 and the actuating finger 80 to the forward position resulting in (a) the engagement of the actuating of the actuating finger 80 with the collar 55 on the second arbor section 20–1 and the rapid longitudinal movement of the rotating second arbor section 20–1 to the advanced position into overlying relation with the webs 31 supported on the other half of the arbor section 20–2 at the winding station at the moment that the flat surfaces of the arbor sections are parallel to the webs, thereby initiating the winding of the webs onto the arbor, and (b) the actuation of the switch 85 to its other position as shown in FIG. 8A. This effects (1) the deenergization of the solenoids 107 and the unclamping of the foils, and (2) the energization of the time delay relay 168 and the closing of the contacts 168–1 thereof for a relative short period of time.

The closing of the contacts 168–1 effects the energization of the solenoid 114 resulting in (a) the actuation of the web shearing blade 110 and the severance of the webs 31 intermediate the first and second stations, and (b) the upward movement of the lower pinch roller 35, resulting in the advancement of the foils 30 by and with the webs 31 onto the rotating arbor 20. After a short period of time the contacts 168–1 of the time delay relay 168 are opened, thereby effecting the deenergization of the solenoid 114 and the downward movement of the lower pinch roller 35 to its normal position.

Shortly thereafter the cam 131 of the timing device closes the switch 130, thereby effecting the transfer of the motor from low to high speed.

As the rotating arbor with the capacitor roll thereon arrives at the second station 26 the capacitator roll 32 engages the heat sealing member 116 which is supported in its path, and after the webs 31 have been severed by the blade 110, the trailing ends of the webs are wound onto the roll 32 and heat sealed thereto. At this time a switch 180 is closed by a cam 181 of the timing device 132 and effects the energization of the solenoid 120 resulting in the operation of the actuator 118 and the withdrawal of the sealing member 116 from the capacitor roll 32 to the retracted position. During this return movement the sealing member actuates a switch 182 to closed position which effects the energization of solenoid 78. This results in the operation of the actuator 71 and the return movement of the actuating finger 69 which through its engagement with the arbor collar 55 effects the retraction of the arbor section 20–2 from the capacitor roll 32.

The reverse movement of the actuating finger 69 actuates a switch 184 to closed position, thereby effecting the energization of the solenoid 79, the operation of the actuator 75 and the retraction of the actuating finger 73, which in turn through its engagement with the collar 53 effects the withdrawal of the arbor section 20–1 from the capacitator roll 32.

Figure 1:
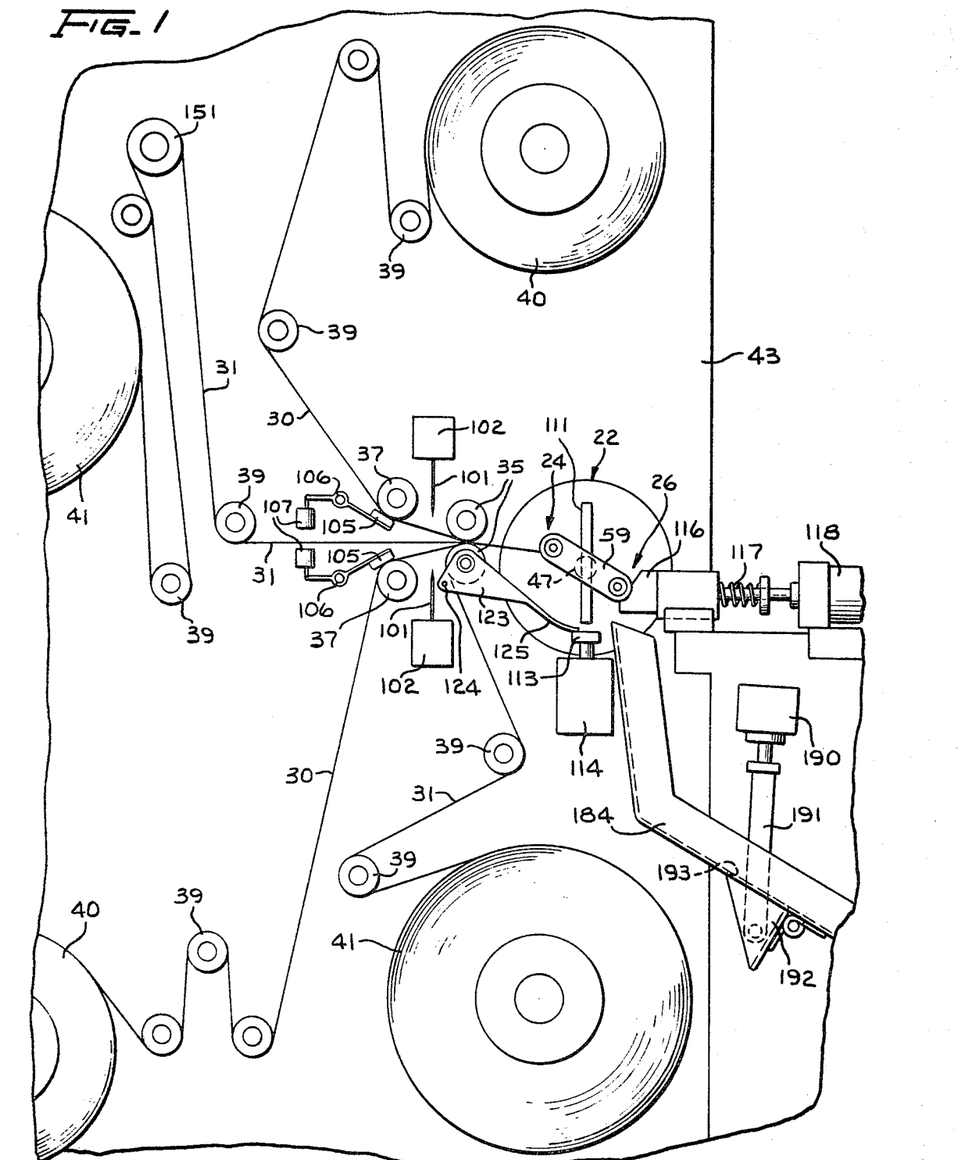
FIG. 1 is a fragmentary front view of an apparatus for winding capacitors embodying the present invention.
Figure 2:
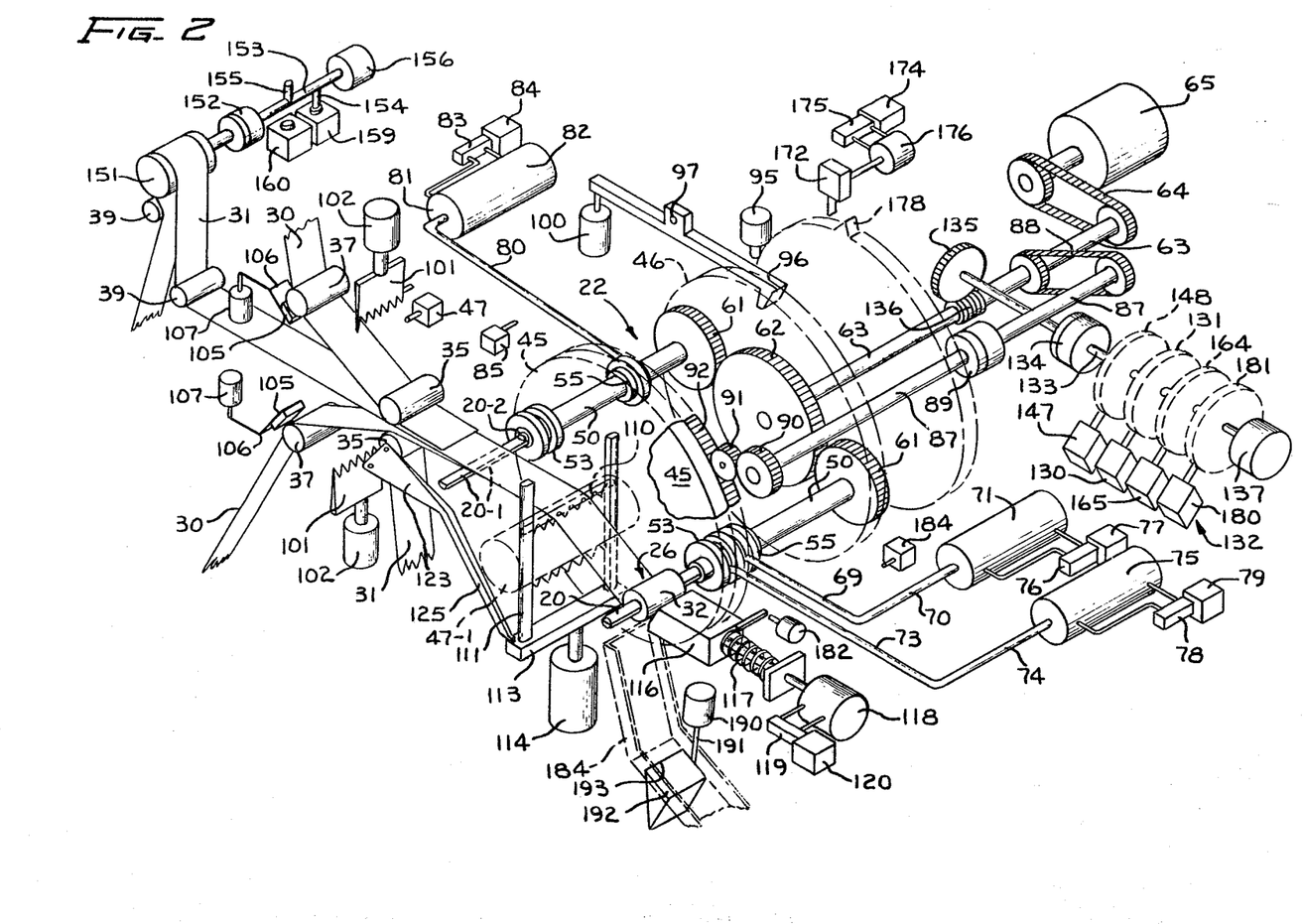
FIG. 2 is a fragmentary diagrammatic perspective view of the apparatus.
Figure 3:
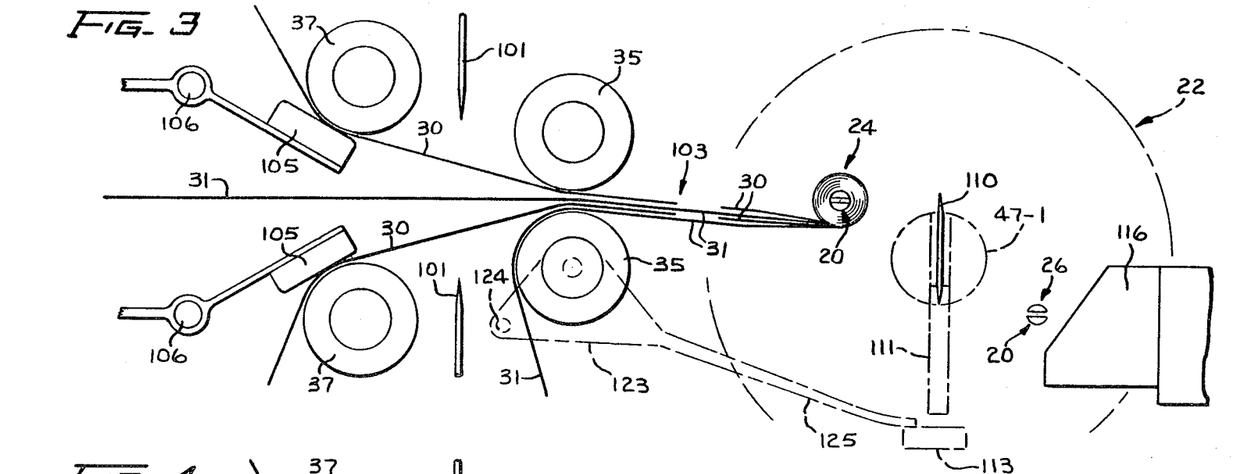
FIGS. 3 and 4 are enlarged, fragmentary, diagrammatic views of the apparatus showing different stages of the winding operation.

Following the retraction of both arbor sections the switch 180 is opened under control of the cam element 181 to effect the deenergization of solenoid 77, 79, 120, and the operation of the actuators 71, 75, 118 associated therewith and the movement of the actuating fingers 69 and 73 and the sealing member 116 to their forward positions as indicated in FIGS. 2 and 8A.

With the retraction of both arbor sections from the capacitor roll 32, the roll drops onto an inclined chute 184 and is guided thereby along a predetermined path into a receptacle (not shown). During the forward movement of the actuating finger 73, it is effective to move the arbor section 20–1 to its forward operative position whereas the arbor section 20–2 remains in its retracted position until after it arrives at the winding station 24 and is subsequently advanced as described hereinabove.

The apparatus as described thus far automatically winds successive capacitors, and during each cycle of operation operates to monitor the capacitance of the capacitator roll being wound in order to effect: the severance of the foil strips when the capacitance of the roll has reached a predetermined value, the overwinding of the webs onto the roll, the severance of the webs, the winding and sealing of the trailing portions of the web to the capacitor roll, and the ejection of the roll from the arbor.

In addition to the above, the apparatus is provided with mechanism for terminating the winding of defective capacitor rolls after a predetermined winding period to prevent the prolonged overwinding of the webs and foils onto the arbor and damage to the apparatus resulting therefrom, and for sorting the defective capacitor rolls from the others. The mechanism includes a time delay relay 186 (FIG. 8) which is connected across the power lines in series with contacts 140–3 of the relay 140. The time delay relay 186 is provided with a first pair of normally opened contacts 186–1 which are connected in series with the control relay 146 and the switch 147 across the power line, and which are connected in parallel with the contacts 145 of the capacitance sensing device 144 and with the contacts 146–5 of relay 146. A second pair of contacts 186–2 of the time delay relay 186 are connected in series with a relay 188 and a pair of normally closed contacts 141–3 of the control relay 141 and in parallel with normally open contacts 188–2 of relay 188.

After the arbor 20 at the winding station 24 has wound the capacitor roll 32 to approximately 80% of completion and the relay 140 is energized as described hereinbefore, the normally closed relay contacts 140–3 of the control relay 140 are actuated to open position thereby deenergizing the time delay relay 186 and causing the normally open contacts 186–1 thereof to be actuated to closed position after a predetermined interval of time during which the winding of the roll 32 continues. The instant at which the contacts 186–1 are closed by the relay 186, occurs at a point in time beyond that at which the capacitance of a nondefective capacitor roll 32 would reach the preset capacitance value, as for example, 120% of the winding time of a nondefective capacitor roll. The closing of the relay contacts 186–1 effects the energization of the control relay 146, resulting in rendering the timing device 132 operative to complete the capacitor winding operation as described hereinabove.

Simultaneous with the closing of the first pair of contacts 186–1 of the relay 186, the second pair of contacts 186–2 are closed which effects the energization of the relay 188, the closing of the contacts 188–1, 188–2 thereof and the locking in of the relay across relay contacts 186–2. The closing of contacts 188–1 results in the energization of a solenoid 190 which is connected through linkage 191 to a trap door 192. The latter is pivotally mounted in an opening 193 in the guide chute 184 and is yieldably maintained by gravity in a normal position in which it closes the opening 193 and forms a portion of the guiding surface of the chute.

Thus when a defective component is being wound and the capacitance thereof does not reach the required value before the lapse of the predetermined period of winding time, the time delay relay 186 operates to complete a circuit to and effect the energization of the control relay 146. With the energization of relay 146 the timing device 132 is rendered operative and the operation of the apparatus for the remainder of the cycle is the same as described hereinabove and includes the severance of the foils, the severance of the webs, the overwinding of the webs, the sealing of the trailing portions of the webs onto the capacitor roll, and the withdrawal of the arbor sections from the defective capacitor roll.

In addition, the time delay relay through the control relay 188 effects the energization of the solenoid 190 and the movement of the trap door 192 to an open position whereby the defective capacitor roll, after it drops from the arbor and moves along the chute 184, drops through the opening 193 therein and is thus segregated from the acceptable capacitor rolls. The trap door 192 remains in the open position until the relay 141 is again energized to effect the opening of the contacts 141–3 thereof and the deenergization of relay 188.

From the foregoing description it will be seen that with the present apparatus and the capacitance monitoring means therein, capacitors may be wound to narrow tolerance. In addition thereto the apparatus provides against the prolonged overwinding of the capacitor forming strips onto the arbor and thereby prevents damage to the apparatus which might result therefrom during the winding of defective capacitor rolls. Also the time delay control mechanism which prevents the prolonged overwinding of defective capacitor rolls, serves as a detector of defective capacitor rolls and cooperates with the trap door operating mechanism to effect the segregation of the defective capacitor rolls.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a capacitor winding apparatus:
   means for winding capacitor forming strips into a capacitor roll;
   means for detecting a defective capacitor during the winding thereof;
   means for removing the wound capacitor roll from the winding means; and
   means under control of said detecting means for segregating the defective capacitor roll.

2. In an apparatus for fabricating capacitors:
   means for winding a capacitor from capacitor forming strips;
   means for monitoring the capacitance of the capacitor being wound;
   means under control of said monitoring means and operable when the capacitance of the capacitor attains a predetermined value for effecting the severance of the capacitor forming strips and the completion of the fabrication of the capacitor; and
   time delay means operable after a predetermined period of winding beyond a range of time in which a capacitor normally attains the predetermined capacitance value for effecting the severance of the capacitor forming strips, and the completion of the fabrication of a defective capacitor.

3. A capacitance winding apparatus as defined in claim 2 including the provision of means responsive to the operation of said time delay means for effecting the segregation of the defective capacitor.

4. A capacitor-winding apparatus, which comprises:
   means for winding a capacitor from capacitor forming strips;
   means for monitoring the capacitance of the capacitor being wound;
   means under control of said monitoring means and operable when the capacitance of the capacitor reaches a predetermined value for effecting the sequential severance of the capacitor forming strips;
   means operable in timed relation to the actuation of said strip severing means for sealing the end portions of the strips to the capacitor;
   means operable in timed relation to the actuation of said strip severing means for ejecting the capacitor from said winding means; and
   time delay means operable after a predetermined period of winding beyond a range of time in which a capacitor normally reaches the predetermined capacitance value for effecting the severance of the capacitor forming strips from such overwound capacitor.

5. A capacitance winding apparatus as defined in claim 4 including the provision of means responsive to the actuation of said time delay means for effecting the segregation of the overwound capacitor.

6. A capacitor winding apparatus comprising:
   means for winding foil and dielectric capacitor-forming strips into a capacitor roll;
   means for monitoring the capacitance of the roll being wound;
   means under control of said monitoring means and rendered operative when the capacitance of the roll reaches a predetermined value for effecting the sequential severance of the foil and the dielectric capacitor-forming strips;
   means operable in timed relation to the operation of said strip severing means for sealing the dielectric strips to the capacitor roll;
   means operable in timed relation to the operation of said strip severing means for ejecting the roll from said winding means; and
   time delay means operable after a predetermined period of winding beyond a range of time in which a capacitor normally reaches the predetermined capacitance value, as when a defective capacitor roll has been wound, for effecting the operation of said strip severing means.

7. A capacitor winding apparatus as defined in claim 6 including the provision of:
   means responsive to the actuation of said time relay means for effecting the segregation of the defective capacitor roll.

8. A capacitor winding apparatus comprising:
   means for winding metallic foils and dielectric webs into a capacitor roll;
   means for effecting the severance of the foils;
   means for effecting the severance of the webs;
   means for sealing the trailing end portion of the severed webs to the capacitor roll;
   means for ejecting the roll from the winding means;
   means for monitoring the capacitance of the roll being wound;
   means for effecting sequentially the operation of said web severing means, said sealing means, and said roll ejecting means;
   means under control of said monitoring means for effecting the operation of said foil severing means when the capacitance of the roll has reached a predetermined value, and for rendering said effecting means operative to effect the actuation of said web severing means, said sealing means, and said roll ejecting means; and
   time delay means operable after a predetermined length of winding time beyond the time range in which a capacitor normally reaches the predetermined value for effecting the operation of said foil severing means and for rendering said effecting means operable to effect the actuation of said web severing means, said web sealing means, and said roll ejecting means.

9. A capacitor winding apparatus as defined in claim 5 including the provision of:
   means operatble under control of said time delay means for segregating the defective capacitor roll.

10. A capacitor winding apparatus comprising a pair of composite arbors, each of said arbors having two sections for receiving a pair of dielectric webs therebetween and for winding the webs and a paid of foils thereon to form a capacitor roll:

turret means for supporting said arbors for rotation about their axes, for longitudinal movement of the arbor sections respectively to and from a normal operative position and a retracted position, and for indexing movement therewith to and from a winding station and an ejecting station;

means for rotating said arbors;

means for guiding the webs and the foils respectively from supplies thereof to the arbor at the winding station;

means for effecting the severance of the foils in advance of the arbor at the winding station;

means for monitoring the capacitance of the roll being wound;

means operable when the capacitance of the roll has reached a predetermined value for effecting the actuation of said foil severing means;

means for indexing said turret;

means for severing the webs between said winding and said ejecting stations;

means at said ejecting station for sealing the end portions of the webs to the roll;

arbor actuating means at said ejecting station for sequentially withdrawing said arbor sections to the retracted positions to effect the ejection of the roll and for returning one of said arbor sections to its operative position whereby in response to the following indexing movement said one arbor section is moved into enagement with the webs at the winding station;

arbor actuating means at the winding station for advancing the other arbor section to operative position to effect the gripping of the webs between the arbor sections and the winding of the webs and the foils into a roll thereon;

time delay means operable after a predetermined interval of winding beyond the time range in which a capacitor normally reaches the predetermined value for effecting the actuation of said foil severing means, as when the capacitor being wound is defective; and     means for effecting the sequential actuation of said turret indexing means, said web severing means, said web sealing means, and said arbor actuating means at said winding and at said ejecting stations in timed relation to the actuation of said foil severing means.

11. An apparatus as defined in claim 10 including the provision of:

means under control of said time delay means for segregating the defective capacitor roll.

References Cited

UNITED STATES PATENTS

| | | | |
|---|---|---|---|
| 1,789,451 | 1/1931 | Rosairee et al. | 29—25.42 |
| 2,384,983 | 9/1945 | Weiss | 242—56.1 |
| 2,767,332 | 10/1956 | Willard | 340—309.6 |
| 2,992,730 | 7/1961 | Rayburn et al. | 324—60 |
| 3,201,056 | 8/1965 | Fanning | 242—56.1 |

JOHN F. CAMPBELL, *Primary Examiner.*

RICHARD BERNARD LAZARUS,
    *Assistant Examiner.*

U.S. Cl. X.R.

83—73; 242—56.1